United States Patent
Hirata et al.

(10) Patent No.: US 6,352,579 B1
(45) Date of Patent: Mar. 5, 2002

(54) CHEMICAL FILTER UNIT AND GAS PURIFICATION SYSTEM

(75) Inventors: Nami Hirata; Yoichi Fujumura; Hideo Saruyama, all of Shiga; Masaki Amano, Chiba, all of (JP)

(73) Assignee: Toray Industries, Inc. (JP)

( * ) Notice: Subject to any disclaimer, the term of this patent is extended or adjusted under 35 U.S.C. 154(b) by 0 days.

(21) Appl. No.: 09/509,703

(22) PCT Filed: Aug. 5, 1998

(86) PCT No.: PCT/JP98/03491

§ 371 Date: Mar. 31, 2000

§ 102(e) Date: Mar. 31, 2000

(87) PCT Pub. No.: WO00/07696

PCT Pub. Date: Feb. 17, 2000

(51) Int. Cl.⁷ .......................... B01D 29/07; B01D 53/14
(52) U.S. Cl. .............. 96/134; 96/142; 96/147; 55/385.2; 55/521; 55/528
(58) Field of Search .................. 96/134, 135, 142, 96/147, 153, 154, 385.1, 385.2, 385.6, 521, 528

(56) References Cited

U.S. PATENT DOCUMENTS

| | | | | |
|---|---|---|---|---|
| 3,664,095 A | * | 5/1972 | Asker et al. ............... | 96/154 |
| 4,181,513 A | * | 1/1980 | Fukuda et al. ............ | 55/528 X |
| 4,217,386 A | * | 8/1980 | Arons et al. .............. | 96/154 X |
| 4,234,326 A | * | 11/1980 | Bailey et al. ............... | 96/154 |
| 4,251,239 A | * | 2/1981 | Clyde et al. ............... | 55/528 X |
| 4,289,513 A | * | 9/1981 | Brownhill et al. .......... | 96/135 |
| 4,391,616 A | * | 7/1983 | Imamura ................... | 96/154 X |
| 4,685,944 A | * | 8/1987 | Allan et al. ................ | 55/521 X |
| 4,904,343 A | * | 2/1990 | Giglia et al. ............... | 55/528 X |
| 5,122,170 A | * | 6/1992 | Satoh et al. ................ | 96/134 |
| 5,350,443 A | * | 9/1994 | Von Blucher et al. ..... | 96/142 X |
| 5,505,769 A | * | 4/1996 | Dinnage et al. ............. | 96/153 |
| 5,616,169 A | * | 4/1997 | De Ruiter et al. ......... | 96/135 X |
| 5,743,940 A | * | 4/1998 | Sugo et al. ................ | 55/528 X |
| 5,772,738 A | * | 6/1998 | Muroaka ................... | 96/135 X |
| 5,922,105 A | * | 7/1999 | Fujii et al. ................. | 96/134 X |
| 5,997,991 A | * | 12/1999 | Kato et al. ................. | 55/521 X |

FOREIGN PATENT DOCUMENTS

| | | | | |
|---|---|---|---|---|
| DE | 3728859 | * | 3/1989 | 96/154 |
| JP | 56-015828 | * | 2/1981 | 96/154 |
| JP | 56-024016 | * | 3/1981 | 96/154 |
| JP | 02-115013 | * | 4/1990 | 96/153 |
| JP | 03-238011 | * | 10/1991 | 96/134 |
| JP | 05-023529 | * | 2/1993 | 96/154 |
| JP | 05-137937 | * | 6/1993 | 96/154 |

* cited by examiner

Primary Examiner—Robert H. Spitzer
(74) Attorney, Agent, or Firm—Schnader Harrison Segal & Lewis LLP

(57) ABSTRACT

A chemical filter unit, which comprises a filter medium formed by laminating a plurality of fiber sheets an a housing the filter medium, and has a gas inlet open on one face of the housing and a gas outlet open on the other face substantially in opposite to the gas inlet, characterized in that gas passages to allow the flow of the gas along the surfaces of the fiber sheets are formed between the respectively adjacent fiber sheets of the filter medium from the gas outlet to the gas outlet, and that the adsorption capacity of the filter medium is 300 eq/m³ or more. It is preferable that the fibers constituting the fiber sheets are ion exchange fibers.

13 Claims, 2 Drawing Sheets

CHEMICAL FILTER UNIT AND GAS PURIFICATION SYSTEM

TECHNICAL FIELD

The present invention relates to a chemical filter unit and a gas cleaning system.

The present invention relates to a chemical filter unit and a gas cleaning system which can decrease the chemical pollutants in a gas, particularly in the air supplied to a clean room, clean booth or clean bench, etc. (hereinafter called a closed clean space) to very low levels by using ion exchange or electric charge adsorbing action, are low in the pressure loss of the gas to be treated and can be used for a long period.

BACKGROUND ARTS

In recent years, in the electric and electronic industry, biochemical industry, etc., the demand for closed clean spaces has been sharply increasing. With the improvement of production techniques in the respective industries, the demand for cleanness becomes very severe. In this connection, techniques for analyzing pollutants are also improving dramatically in these years. As a result, the necessity of removing conventionally overlooked substances has been noticed.

The conventional cleaning of air in closed clean spaces is to mainly remove solid particulates by using particulate removing filters such as HEPA filters, and the removal of solid particulates is now controlled to the greatest possible extent.

However, it has been found that when the air in a closed clean space is used cyclically through filters, some of the misty or gaseous chemical substances contained in the air are rather concentrated to levels higher than those in open air. The reason is that in the conventional cleaning of air, the necessity of removing misty or gaseous chemical substances contained in the air has not been noticed, and therefore that the conventional air cleaners did not have such a function.

In the electronic industry where products like very large scale integrated circuits are produced, the necessity of removing the chemical substances began to be noticed. Especially in the photolitho process, the phenomena that the yields of products are lowered by the presence of these chemical substances have been found, and the necessity of developing chemical substance removing techniques of a concept quite different from that adopted in the conventionally used HEPA filters has been noticed.

Especially it is demanded to develop techniques for removing ammonia and amines such as organic amines. Ammonia causes haze and dielectric breakdown in the product, and its presence greatly lowers the yield of the product.

In the chemically amplified resist production process of the photolitho process, protons are generated in the regions irradiated with light as a chemical amplifying agent, to promote the dissolution into the developer. According to this mechanism, the device is formed. If ammonia exists in the atmosphere, protons are neutralized, and dissolution into the developer in this portion is inhibited. This causes a very serious problem called T-TOP failure.

This phenomenon occurs when the ammonia concentration in the air is as small as several parts per billion. The ammonia concentration of the air to be treated is usually tens to hundreds of parts per billion, though different from place to place. To solve the problem, it is necessary that the ammonia concentration in the cleaned air is 5 ppb or less.

LSI manufacturers are required to solve this problem, and desire the development of any filter unit which can keep the ammonia concentration in the air of a closed clean production space as very low as possible.

Japanese Patent Laid-Open No. 1-317512 discloses a method for removing sea salts (including ammonia) in air by letting the air pass through a filter medium containing ion exchange fibers. However, this technique does not state any possibility of removing ammonia by adsorption down to a very low concentration (order of ppb), or any method for lessening the pressure loss of the filter using the filter medium, or any method for increasing the substance adsorption capacity per unit volume of the filter medium which indicates the filter service life.

Japanese Patent Laid-Open No. 61-138543 discloses a filter medium obtained by corrugating a laminate formed by overlaying pulp sheets on both sides of an ion exchange fiber-containing sheet. However, the filter medium is used in the crossflow method in which a gas is fed from the front sheet face of the filter medium to the back sheet face. The technique does not state any method for lessening the pressure loss of the filter using the filter medium or any method for increasing the substance adsorption capacity per unit volume of the filter medium which indicates the filter service life.

Japanese Patent Laid-Open No. 60-183022 discloses a filter composed of cation exchange fibers for arresting mutagenic substances in air. However, the filter medium is used in the crossflow method. The technique does not state any method for lessening the pressure loss of the filter using the filter medium or any method for increasing the substance adsorption capacity per unit volume of the filter medium which indicates the filter service life.

Japanese Laid-Open No. 8-24564 discloses a filter unit containing ion exchange fiber sheets. However, the technique does not state any method for lessening the pressure loss of the filter in the filter unit or any method for increasing the substance adsorption capacity per unit volume of the filter medium which indicates the filter service life.

Therefore, the above prior art cannot meet the demand in the above technique field.

The object of the present invention is to provide a filter unit and a gas cleaning system capable of responding to the above demand.

The present invention provides a filter unit with a very large adsorption capacity of the filter medium compared to the conventional filter media and small in the pressure loss of the filter medium compared to the conventional filter media.

To solve the above problems, it has been considered to increase the quantity of the filter medium per volume, but this method does not solve the latter problem. To solve the latter problem, it has been considered to decrease the quantity of the filter medium per volume, but this method does not solve the former problem. The present invention solve these contradictory problems all at once.

DISCLOSURE OF THE INVENTION

First Version of the Invention

A chemical filter unit, which comprises a filter medium formed by laminating a plurality of fiber sheets and a housing for containing the filter medium, and has a gas inlet open on one face of the housing and a gas outlet open on the other face substantially opposite to the gas inlet, characterized in that gas passages to allow the flow of the gas along the surfaces of the fiber sheets are formed between the respectively adjacent fiber sheets of the filter medium from the gas inlet to the gas outlet, and that the adsorption capacity of the filter medium is 300 eq/m³ or more.

The gas passages allow the raw gas to flow mainly along the surfaces of the fiber sheets constituting the filter medium. This means that the flow of the raw gas through the filter medium is parallel flow. Since this structure is formed substantially by fiber sheets only, the adsorption capacity of the filter medium can be kept at 300 eq/m³ or more and the pressure loss of the filter medium can be kept small.

The adsorption capacity refers to the amount of plus charged particulates, mist and gas adsorbed per unit volume (1 m³) of the is filter medium under chemical balance. For example in the case of active carbon fibers carrying phosphoric acid, the adsorption capacity is calculated from the total weight of the carried phosphoric acid, based on the maximum balancing capacity achieved when all the reactive groups have reacted to form salts.

In the case of ion exchange fibers, the ion exchange capacity is the adsorption capacity. The method for measuring the ion exchange capacity is not specified. In general, a filter medium with a certain capacity is cut off and caused to react in an acid or alkali with a known normality, and the residue is neutralized for titration.

Second Version of the Invention

A chemical filter unit, according to the first version, wherein when the average flow velocity at the gas inlet, of the gas flowing from the gas inlet to the gas outlet is 0.5 m/sec, the pressure loss of the flowing gas by the filter medium with a depth of 70 mm in the gas passage direction is 3 mm Aq or less.

Third Version of the Invention

A chemical filter unit, according to the first or second version, wherein the fibers constituting the fiber sheets are chemically modified active carbon fibers (for example, active carbon fibers carrying phosphoric acid) or ion exchange fibers, preferably ion exchange fibers.

The ion exchange fibers used here will be described later in detail.

Fourth Version of the Invention

A chemical filter unit, according to any one of first to third versions, wherein the filter medium is immobilized in the housing substantially only by the resiliency of the plurality of fiber sheets.

That the filter medium is immobilized substantially only by the resiliency of the plurality of the fiber sheets means that when the filter unit is used, the means for laminating the fiber sheets and immobilizing the filter medium in the housing do not evolve any gas to decrease the effect of gas cleaning. For example, if the fiber sheets are laminated using an adhesive or supported in their form by any other organic material or if the filter medium is immobilized in the housing using an adhesive, then any gas to decrease the effect of air cleaning may be evolved.

Other versions of the present invention will be described below in more practical explanation with respect to the present invention.

It is preferable that the fiber sheets are formed by scooping short fibers of 0.1 to 10 mm in length, such as filter paper using a wire cloth. It is preferable that the a real unit weight of the fibers of the fiber sheets is in a range of 30 to 1000 g/m², and a more preferable range is 50 to 500 g/m². If the fiber sheets are post-processed by folding or thermal bonding, etc., an especially preferable range is 100 to 300 g/m².

The fiber sheets may also have any other material than the chemically modified active carbon fibers and ion exchange fibers mixed. For improving paper formability, long fibers of cellulose or pulp, etc. may be mixed to some extent. Inorganic fibers can also be mixed. When other materials are mixed, it is preferable that the amount of the chemically modified active carbon fibers or ion exchange fibers is 50 wt % or more.

It is important that the filter medium is a three-dimensional structure formed by a laminate comprising a plurality of fiber sheets, and that gas passages from one face of the filter medium to the corresponding other face are formed between the adjacent fiber sheets.

The gas passages can be formed by laminating undulating fiber sheets. For example, corrugated structure, honeycomb structure, simply wavy structure and their combinations, etc. can be used. Corrugated fiber sheets can be preferably used.

A corrugated board can also have a flat fiber sheet (liner) in contact with the crests of corrugated fiber sheets (corrugating media)

A corrugated board with a liner can be produced by feeding a fiber sheet destined to be a corrugating medium between two rotating rolls with undulating surfaces to prepare a corrugating medium. The corrugating medium is then sent by a rotating roll which is corrugated on the surface like the corrugation of the corrugating medium, while a fiber sheet destined to be a liner is sent by a roll flat on the surface installed in opposite to the rotating roll. The corrugating medium and the liner are pressed together by both the rotating rolls, to produce the intended corrugated board. The fiber sheet destined to be a corrugating medium can also be a laminate comprising a plurality of fiber sheets.

In the above, if a powdery or fibrous heat fusible polymer is contained in at least either of the fiber sheet destined to be a corrugating medium or the fibrous sheet destined to be a liner, the heat fusible polymer is melted by heat when the corrugating medium and the liner are pressed together by the rotating rolls, to effectively integrate the corrugating medium and the liner.

The heat fusible polymer is only required to be a polymer with a melting point lower than that of the fibers mainly used in the fiber sheet, for example, polystyrene or poly-α-olefin forming the ion exchange fibers, and is not especially limited. It can be selected as required from low melting point polymers such as polyesters, polyolefins, vinyl polymers, etc. The form of the heat fusible polymer contained in the fiber sheet is not especially limited. However, considering the easiness of mixing with the ion exchange fibers or active carbon fibers and paper formability, it is preferable that the heat fusible polymer is fibrous.

A filter medium with an adsorption capacity of 300 eq/m³ or more can be obtained by using chemically modified active carbon fibers (for example, active carbon fibers carrying phosphoric acid), or ion exchange fibers as the fibers forming the fiber sheets.

It is preferable that the ion exchange fibers are based on polystyrene. It is more preferable that they are conjugate fibers consisting of a polymer with ion exchange groups introduced into crosslinked insolubilized polystyrene and a reinforcing polymer (e.g., a polyolefin).

Since polystyrene has low toughness, it is difficult to form fibers with practically endurable mechanical performance by polystyrene alone. So, for obtaining fibers with mechanical properties, a reinforcing polymer is used to be conjugated with polystyrene.

It is preferable that the water content of the ion exchange fibers is in a range of 1.0 to 5.0. The water content is obtained by immersing the sample fibers as a Na type (Cl type) cation (anion) exchanger sufficiently in ion exchange water, removing the water on the surfaces by centrifugal dehydration, measuring the weight (W) immediately, drying the sample, measuring the weight ($W_0$) after drying, and calculating from the following formula using the measured values. Water content=$(W-W_0)/W_0$.

It is preferable that the diameter of the ion exchange fibers is in a range of 15 to 100 μm in a dry state. A more preferable range is 20 to 70 μm, and a further more preferable range is 30 to 50 μm. If the diameter is in this range, the specific surface area as a fiber sheet can be enhanced.

The conjugated form of the polymer to have ion exchange groups introduced and the reinforcing polymer is not especially limited. Core-sheath type conjugate fibers consisting of an ion exchange polymer as the main sheath component and a reinforcing polymer as the core component can be preferably used. Islands-in-a-sea-type conjugate fibers belong to the core-sheath type conjugate fibers, and are especially preferable since they have high toughness and high bondability between the polymer to have ion exchange groups introduced and the reinforcing polymer. Blend type conjugate fibers in which both the polymers are blend-spun can also be preferably used.

Polymers which can be used as the reinforcing polymer include poly-α-olefins, polyamides, polyesters, polyacrylic compounds, etc. Among them, poly-α-olefins are preferable since they are excellent in chemicals resistance.

The poly-α-olefins include polyethylene, polypropylene, poly-3-methylbutene-1, poly-4-methylpentene-1, etc. Among them, polyethylene is preferable since it is excellent in strength and production convenience.

The fibers are cut into short fibers with an appropriate length, and have ion exchange groups introduced into the ion exchange polymer portions. The ion exchange groups can be either cation exchange groups or anion exchange groups.

The length of the short fibers is optional. If they are too short, fibers are likely to come off from the formed fiber sheet unpreferably, and if too long, the ion exchange reaction in the fiber sheet is likely to be less homogeneous unpreferably. It is preferable that the length of the short fibers is in a range of 0.1 to 10 mm. A more preferable range is 0.3 to 5 mm, and a further more preferable range is 0.3 to 1 mm.

Preferably used anion exchange groups include strong basic anion exchange groups obtained by treating a haloalkylated compound using a tertiary amine such as trimethylamine, and weakly basic anion exchange groups obtained by treating using a secondary or primary amine such as isopropylamine, diethylamine, piperazine or morpholine. To preferably achieve the object of the present invention, a strongly basic anion exchange group is more preferable.

If a filter medium composed of anion exchange fibers is used, the adsorption capacity of the present invention is the anion exchange capacity.

Preferably used cation exchange groups include sulfonic acid groups, phosphonic acid groups, carboxylic acid groups and aminocarboxylic acid groups such as iminodiacetic acid groups.

The ammonia and amines such as organic amines in the raw gas (air) exist as plus charged particulates, mist and gas.

To effectively adsorb them for removal using the filter unit of the present invention, it is preferable that the ion exchange groups are cation exchange groups, and sulfonic acid groups are more preferable.

When a filter medium composed of cation exchange fibers is used, the adsorption capacity of the present invention is the cation exchange capacity.

Ion exchange fibers can be produced, for example, by crosslinking and insolubilizing the polystyrene portions of conjugate fibers consisting of a polstyrene based compound and a poly-α-olefin by formaldehyde in the presence of an acidic catalyst, and introducing designed ion exchange groups into the polystyrene portions.

It is preferable that the amount of ion exchange groups introduced is 0.5 meq/g or more based on the dry weight of fibers, and a more preferable range is 1.0 to 10 meq/g.

The housing of the filter medium is, for example, a box with a cover. The top of the cover and the bottom of the box have openings to allow the passage of the gas. The cover is coupled with the box after the filter medium is installed in the box.

It is preferable that the filter medium is installed in the housing in a compressed state, and that its resiliency for restoring its original form is used for immobilizing the filter medium in the housing, without using any adhesive.

DETAILED DESCRIPTION OF THE PREFERRED EMBODIMENT

Preferable examples of the present invention are described below, but the present invention is not limited thereto or thereby.

Figure 1:
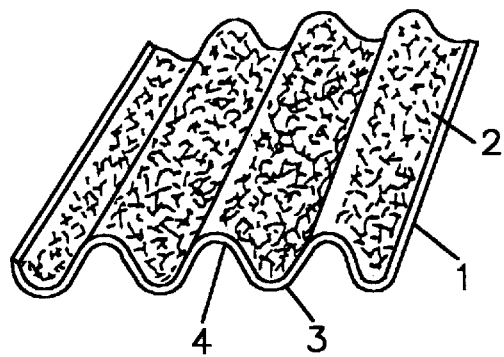
FIG. 1 is a perspective view showing a fiber sheet used in the filter unit of the present invention as an example.

FIG. 1 shows a fiber sheet used for forming the filter medium of the filter unit of the present invention as an example. The fiber sheet 1 is formed by scooping short fibers 2 by a wire cloth to form paper, and after paper formation, it is processed to have a corrugation 3. A plurality of such fiber sheets 1 are laminated to form a filter medium. In the filter medium, gas passages 4 are formed between the respective fiber sheets 1.

Figure 2:
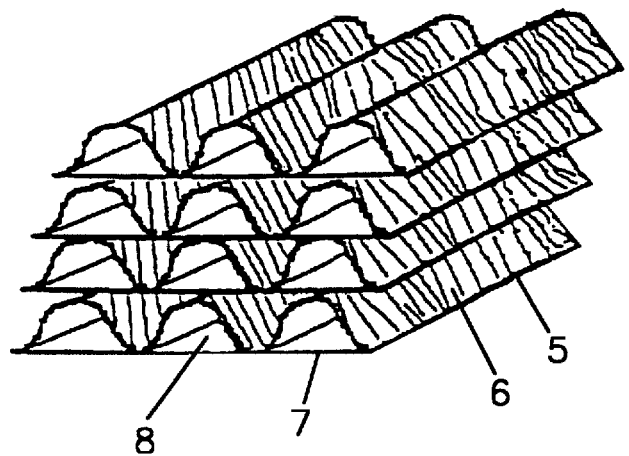
FIG. 2 is a perspective view showing a filter medium used in the filter unit of the present invention as an example.

FIG. 2 shows a filter medium used in the filter unit of the present invention as an example. The filter medium 5 is a laminate comprising sets of fiber sheets. One set of fiber sheets is a corrugated board comprising a fiber sheet 6 as a corrugating medium and a fiber sheet 7 as a liner, and gas passages 8 are formed between the fiber sheet 6 as a corrugating medium and the fiber sheet 7 as a liner.

Figure 3:
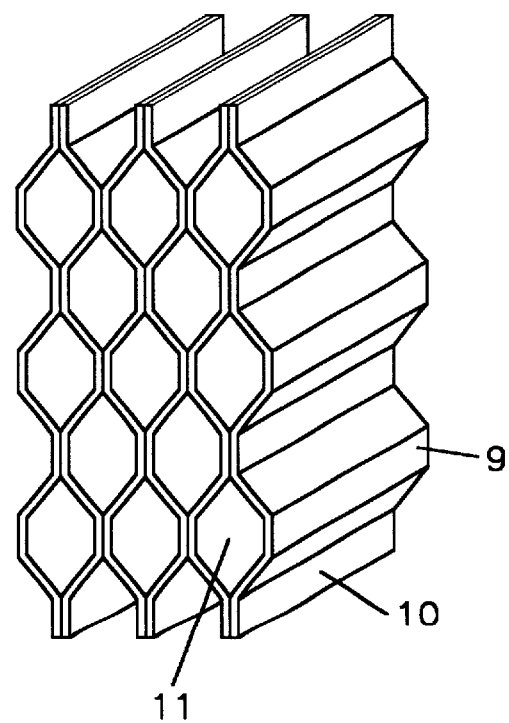
FIG. 3 is a perspective view showing a filter medium used in the filter unit of the present invention as another example.

FIG. 3 shows a filter medium used in the filter unit of the present invention as another example. The filter medium 9 is a laminate comprising plurality of fiber sheets 10. The respective fiber sheets 10 are laminated to have a honeycomb structure. The hollow portions of the honeycomb form the gas passages 11.

Figure 4:
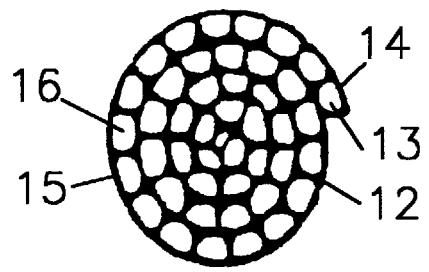
FIG. 4 is a front view of a filter medium used in the filter unit of the present invention as a further other example.

FIG. 4 shows a filter medium used in the filter unit of the present invention as a further other example. The filter medium 12 is formed by winding one corrugated board 15 comprising a fiber sheet 13 as a corrugating medium and a fiber sheet 14 as a liner, continuously from the center toward the outside. Between the fiber sheet 13 as a corrugating medium and the fiber sheet 14 as a liner, gas passages 16 are formed.

Figure 5:
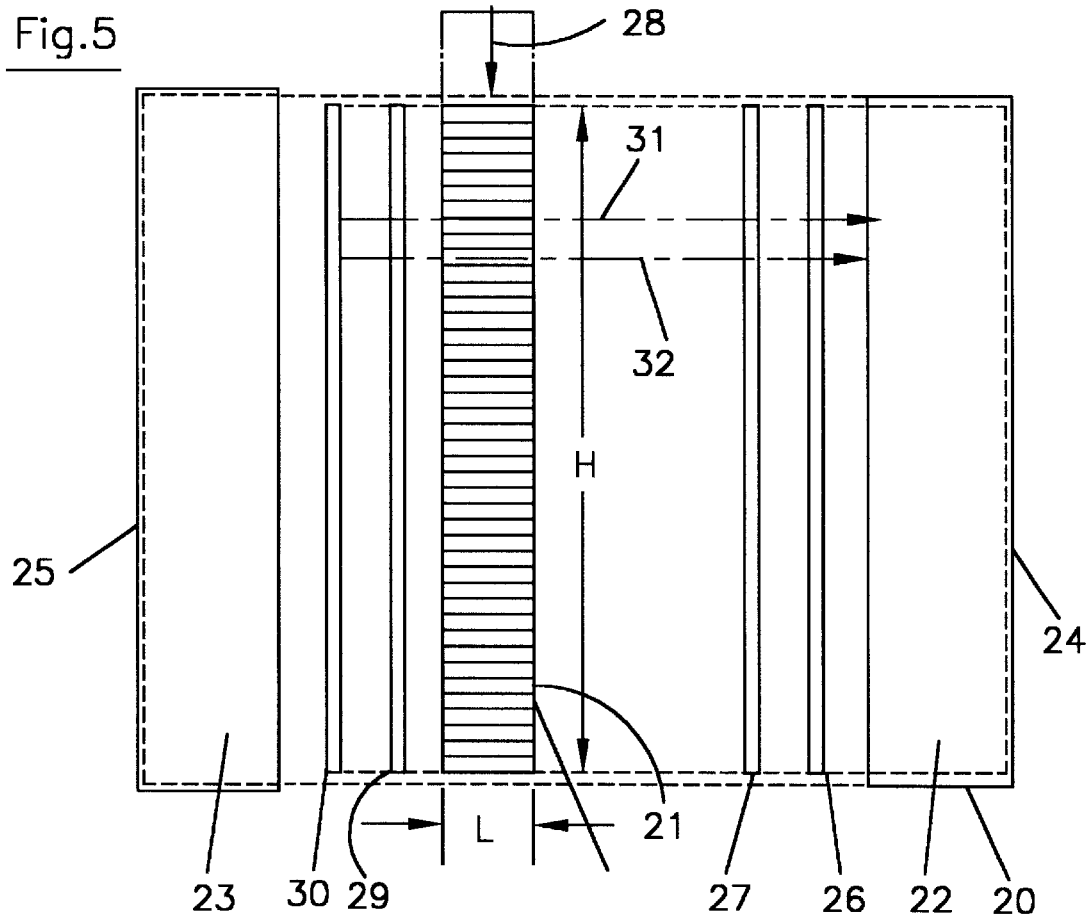
FIG. 5 is an exploded side view showing the filter unit of the present invention as an example.

FIG. 5 shows the filter unit of the present invention as an example. The filter unit 20 has a filter medium-containing box 22 for containing a filter medium 21 and a cover box 23 to cover the filter medium-containing box 22 after the filter medium 21 has been installed in the filter medium-containing box 22. On the opposite faces of the filter medium-containing box 22 and the cover box 23, openings 24 and 25 for allowing the passage of gas are formed respectively.

Before the cover box 23 is installed to cover the filter medium-containing box 22, a front non-woven fabric 29 and a front aluminum screen 30 are installed in this order. Then, the cover box 23 is installed to cover the filter medium-containing box 22. The movement of the aluminum screen 30 and cover box 23 toward the filter medium-containing box 22 is indicated by arrows 31 and 32. Both of them are fastened by fasteners (not illustrated). Thus, the filter unit of the present invention as an example is completed. The filter medium-containing box 22 with the opening 24 and the cover box 23 with the opening 25 form the housing of the present invention.

Before the cover box 23 is installed to cover the filter medium-containing box 22, a front non-woven fabric 29 and a front aluminum screen 30 are installed in this order. Then, the cover box 23 is installed to cover the filter medium-containing box 22. The movement of the cover box 23 toward the filter medium-containing box 22 is indicated by an arrow 32. Both of them are fastened by fasteners (not illustrated). Thus, the filter unit of the present invention as an example is completed. The filter medium-containing box 22 with the opening 24 and the cover box 23 with the opening 25 form the housing of the present invention.

EXAMPLE

Ion Exchange Fibers

An islands-in-a-sea type conjugate fiber with polystyrene as the sea component and polyethylene as the island component, with the sea component and the island component conjugated at 50 to 50 and having 16 islands was prepared. The fiber was cut at a length of 0.5 mm.

One part by weight of the cut fibers were added into a crosslinking and sulfonating solution consisting of 7.5 parts by volume of marketed grade 1 sulfuric acid and 0.07 part by weight of para formaldehyde, for reaction treatment at 90° C. for 4 hours.

After completion of reaction treatment, the cut fibers were treated by an alkali and activated by hydrochloric acid, to obtain cation exchange fibers with sulfonic acid groups. The cation exchange fibers had an exchange capacity of 3.0 milliequivalents/g-Na and a water content of 1.5. The exchange capacity was measured according to the following method.

One gram of cation exchange fibers were added to 50 ml of 0.1N sodium hydroxide, and the mixture was shaken for 2 hours. Five milliliters of the solution was taken and neutralized for titration. Based on the result, the exchange capacity was calculated.

The cut fibers converted into Na type (Cl type) were sufficiently immersed in ion exchange water, and dewatered by a centrifugal dehydrator, and the weight (W) of the cut fibers was measured. Furthermore, the cut fibers were dried at 60° C. for 48 hours in a dryer, and the weight ($W_0$) of the cut fibers was measured. From the formula $(W-W_0)/W_0$, the water content of the cut fibers was obtained.

Paper Forming

The obtained ion exchange fibers, heat fusible fibers (a polyester with a low melting point, trade name "Sofit N720" produced by Kuraray) (1 mm long) and Manila hemp (10 mm long) as a paper forming aid were mixed at a ratio of 60:20:20, and formed into paper by a rotary filter cloth type large paper machine, and dried by a drum rotary dryer at 120° C., then being wound as a fiber sheet (0.55 mm thick).

From the fiber sheet, a 3 cm square sheet sample was cut off and immersed in a sodium hydroxide solution as described for the ion exchange fibers, to measure the ion exchange capacity per sample weight. The ion exchange capacity was 1.5 meq/g.

Corrugating

The obtained fiber sheet was corrugated by a corrugator (a single facer for No.5 corrugated fiberboard). In the corrugator, a rotating roll with a corrugating surface (120 to 130° C.), a fiber sheet destined to be a corrugating medium, a fiber sheet destined to be a liner and a rotating pressure roll with a flat surface were located from top to bottom in this order. The fiber sheet destined to be a corrugating medium and the fiber sheet destined to be a liner were passed between the rolls, and pressed together by heat and pressure, into a corrugated board.

From the corrugated board, a 2 cm square sheet sample was cut off and immersed in a sodium hydroxide solution as described for the ion exchange fibers, to measure the ion exchange capacity per sample weight. The ion exchange capacity was 1.45 meq/g.

Filter Unit

From the obtained corrugated board, many sheets having a width of 590 mm× a length of 70 mm sheets were cut out in the state of that the gas passages are positioned in the length direction. These corrugated sheets were piled with the gas passages kept in the same direction, and compressed as a 590 mm in width×590 mm in height (H)×70 mm in depth (L) filter medium, being installed in the aluminum housing, to produce a filter unit of the present invention. In FIG. 5, the height of the filter medium is expressed by symbol H, and the depth of the filter medium, by symbol L.

The total weight of the filter medium installed in the filter unit was 6050 g. The ion exchange capacity per unit volume was 360 eq/m³.

Figure 6:
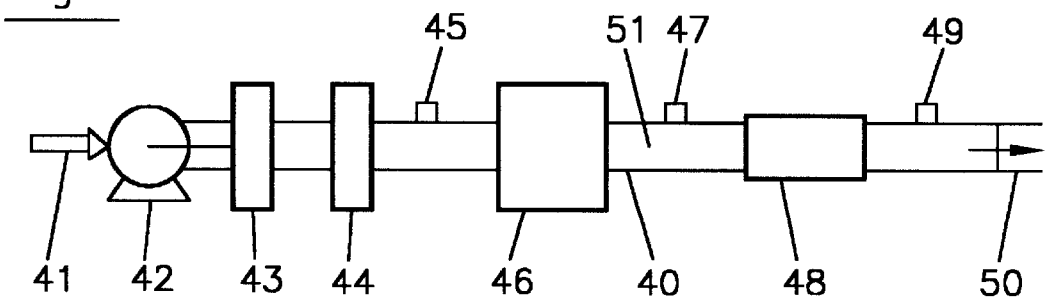
FIG. 6 is a schematic side view showing an ammonia absorbability testing system for the chemical filter used in the filter unit of the present invention.

An ammonia absorbability test of the filter unit of the present invention is described below. The testing system is shown in FIG. 6. In FIG. 6, the testing system 40 is composed of a fan 42 for introducing open air 41, an active carbon chemical filter 43, a HEPA filter 44, a gas mixer 46, a filter unit 48 of the present invention and an exhaust pipe 50. These components are arranged from left to right in the drawing, and connected by a gas feed pipe 51 respectively. The gas feed pipe 51 between the HEPA filter 44 and the gas mixer 46 is provided with an ammonia introducing port 45. The gas feed pipe 51 between the gas mixer 46 and the filter unit 48 is provided with a first sampling port 47 for sampling the gas, and the gas feed pipe 51 between the filter unit 48 and the exhaust pipe 50 is provided with a second sampling port 49 for sampling the gas.

While the open air 41 is introduced by the fan 42 into the system 40, ammonia gas is injected from the ammonia introducing port 45, to keep the ammonia concentration of air at 200 ppb at the outlet of the gas mixer 46. The average flow velocity of air at the inlet of the filter unit 48 was set at 0.5 m/sec. The pressure loss in the filter medium of the filter unit 48 measured in this case was 1.7 mm Aq.

After lapse of certain time, the air flowing upstream and downstream of the filter unit 48 was sampled at the first sampling port 47 and the second sampling port 49.

The samples taken from the first sampling port 47 and the second sampling port 49 were directly introduced into the ultra pure water in an impinger. The concentrations of the ammonia dissolved in ultra pure water were measured by ion chromatography. Based on the measured values, simulation was effected.

As a precondition of simulation, the time taken after feeding 10 ppb ammonia gas till the concentration at the outlet of the filter unit 48 began to exceed 1 ppb was defined as the life of the filter unit 48. The life was decided considering the conditions required for the closed clean spaces in the electronic industry. As a result of analysis, the life of the filter unit 48 was judged to be 890 days. This result means that the filter unit 48 can be continuously used in an air cleaning system for an actual closed clean space for 2 years without being exchanged.

COMPARATIVE EXAMPLE 1

The fiber sheets prepared as described for the Example were corrugated as described for the Example, except that the void after corrugation was changed. From the obtained corrugated board, the same corrugated sheets as obtained in the Example were cut out, and from them, a filter unit was produced as described for the Example. The total weight of the filter medium in the filter unit was 4870 g. The ion exchange capacity per unit volume was 290 eq/m$^3$.

The filter unit was used to perform the same ammonia absorbability test as in the Example. The pressure loss of the filter medium of the filter unit was 1.3 mm Aq, being lower than that obtained in the Example.

Though a high ammonia removal rate was observed in the beginning of the test, it was found that the removal rate declined at a high rate with the progression of test. As a result of simulation, the life of the filter unit was judged to be 590 days. According to the equipment repair practice in the industry, if a filter unit is estimated, at the time of current periodical maintenance, to come to the end of its life before the next time of periodical maintenance, the filter unit is exchanged at the time of current periodical maintenance, and in this case, the number of 590 days means that the filter unit must be exchanged in one year.

COMPARATIVE EXAMPLE 2

For a marketed filter unit (the width of 590 mm× the height of 590 mm (H)× the depth of 70 mm (L) filter medium) in which an ion exchange non-woven fabric obtained by irradiating a polyolefin filament non-woven fabric with electron rays to form graft sites and converting the fibers into cation exchange fibers by graft reaction is installed in a housing together with spacers formed by aluminum wires, the same test as performed for the Example was performed.

The ion exchange capacity of the filter medium was 2.5 meq/g, and the weight of the installed filter medium was 2068 g. The ion exchange capacity per unit volume of the filter medium was 220 eq/m$^3$.

As a result of simulation, the life of the marketed filter unit was judged to be 586 days, but the pressure loss of the filter medium was as very high as 6.0 mm Aq.

Since the gas flow velocity had to be kept at the same level as that in the Example, the fan from the Example had to be changed to a fan with a larger capacity in the test for the filter unit with a higher pressure loss.

INDUSTRIAL AVAILABILITY

The chemical filter unit and the gas cleaning system of the present invention can remove the chemical pollutants in a closed clean space down to very low levels, and are low in pressure loss and long in life. So, they are especially useful in the electronic industry where products sensitive to chemical pollutants such as very large scale integrated circuits are produced.

What is claimed is:

1. A chemical filter unit, which comprises:
    a filter medium formed by laminating a plurality of fiber sheets and a housing for containing said filter medium, said filter medium having a gas inlet open on one face of said housing and a gas outlet open on another face substantially opposite to said gas inlet; and
    gas passages to allow the flow of gas along surfaces of said fiber sheets, said gas passages being formed between two of said fiber sheets adjacent to each other;
    wherein the adsorption capacity of said filter medium is 300 eq/m$^3$ or more.

2. A chemical filter unit, according to claim 1, wherein the average flow velocity of said gas flowing from said gas inlet to said gas outlet is 0.5 m/sec at said gas inlet and the pressure loss of said flowing gas by said filter medium with a depth of 70 mm in the gas passage direction is 3 mm Aq or less.

3. A chemical filter unit, according to claim 1, wherein the fibers constituting said fiber sheets are ion exchange fibers, and the adsorption capacity is the ion exchange capacity.

4. A chemical filter unit, according to claim 3, wherein said ion exchange fibers are islands-in-a-sea conjugate fibers.

5. A chemical filter unit, according to claim 4, wherein said ion exchange fibers are cation exchange fibers.

6. A chemical filter unit, according to claim 5, wherein the sea component of said islands-in-a-sea conjugate fibers is a polystyrene based polymer.

7. A chemical filter unit, according to claim 1, wherein 50 wt % or more of said fiber sheets are fibers of 0.1 to 10 mm in length.

8. A chemical filter unit, according to claim 1, wherein said filter medium is immobilized substantially only by the resiliency of said plurality of fiber sheets.

9. A chemical filter unit, according to claim 1, wherein said fiber sheets contain a heat fusible material, and said plurality of fiber sheets are laminated by the fusing of said heat fusible material.

10. A gas cleaning system, comprising a production room and a gas cleaner for supplying a clean gas to the production, room, wherein the gas cleaner contains the chemical filter unit stated in any one of claims 1 through 9.

11. A gas cleaning system, according to claim 10, wherein the production room contains an LSI production process.

12. A gas cleaning system, according to claim 11, wherein the production room contains a photolitho process in said LSI production process.

13. A gas cleaning system, according to claim 11, wherein the production room contains a chemically amplified resist process in said LSI production process.

* * * * *

UNITED STATES PATENT AND TRADEMARK OFFICE
CERTIFICATE OF CORRECTION

PATENT NO.    : 6,352,579 B1
DATED         : March 5, 2002
INVENTOR(S)   : Hirata et al.

It is certified that error appears in the above-identified patent and that said Letters Patent is hereby corrected as shown below:

<u>Title page,</u>
Item [57], ABSTRACT,
Line 2, please change "an a housing" to -- and a housing for containing --.

Signed and Sealed this

Twenty-fifth Day of June, 2002

*Attest:*

JAMES E. ROGAN
*Attesting Officer*      *Director of the United States Patent and Trademark Office*